No. 607,795. Patented July 19, 1898.
A. I. GALLAWAY.
BICYCLE SUPPORT.
Application filed May 27, 1897.

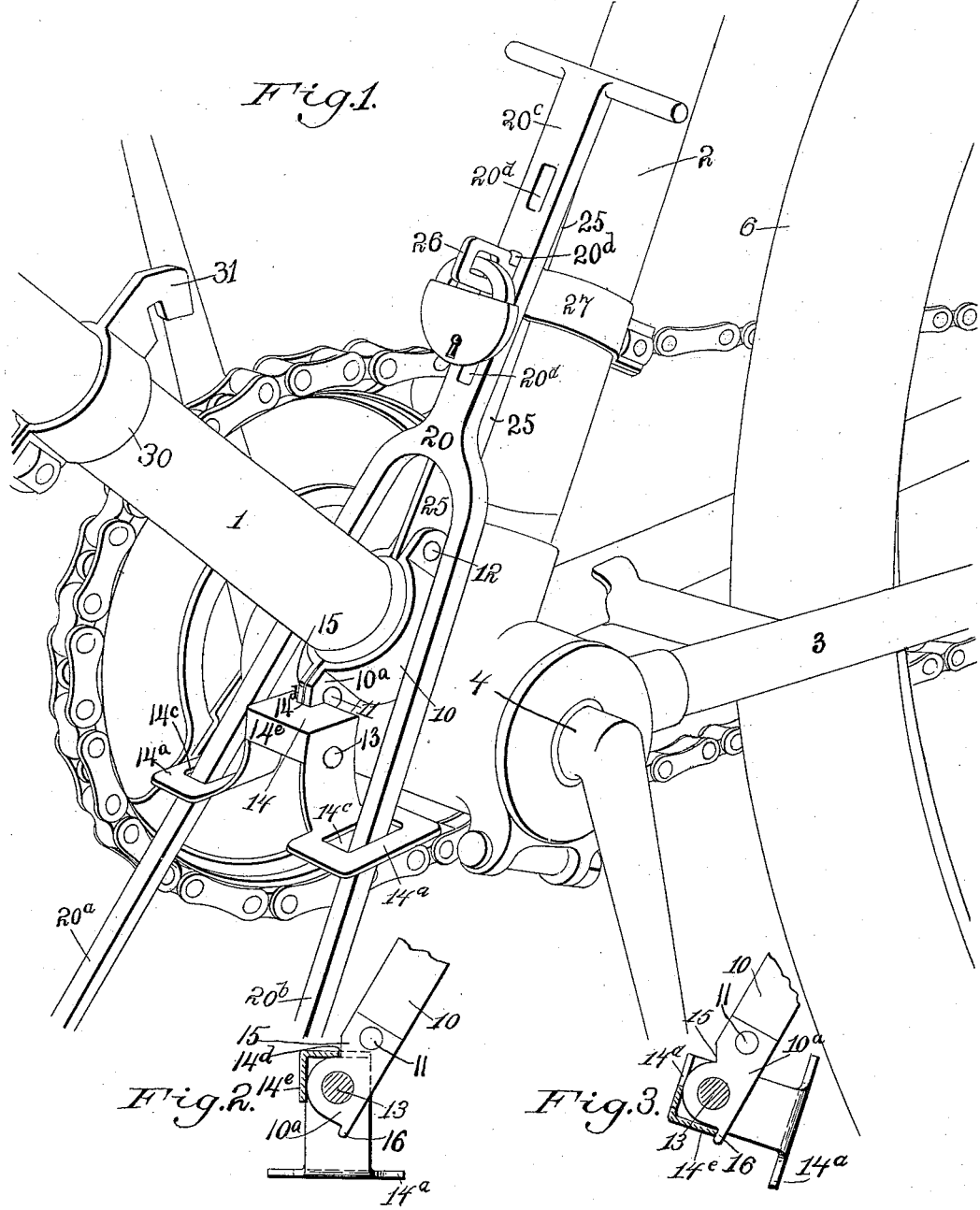

(No Model.) 2 Sheets—Sheet 2.

Witnesses.
W. E. Allen
Walter Allen

Inventor.
Albert I. Gallaway,
By Knight Bros
Attys.

UNITED STATES PATENT OFFICE.

ALBERT I. GALLAWAY, OF MORRISTOWN, NEW JERSEY, ASSIGNOR OF ONE-HALF TO DAVID SAYRE ENSLEE, OF SAME PLACE.

BICYCLE-SUPPORT.

SPECIFICATION forming part of Letters Patent No. 607,795, dated July 19, 1898.

Application filed May 27, 1897. Serial No. 638,362. (No model.)

*To all whom it may concern:*

Be it known that I, ALBERT I. GALLAWAY, a citizen of the United States, residing at Morristown, in the county of Morris and State of New Jersey, have invented certain new and useful Improvements in Bicycle-Supports, of which the following is a specification.

My present invention relates particularly to improvements in the bicycle-support covered by Patent No. 578,694, granted to me March 9, 1897. The bicycle-support covered by said patent comprises a guide swiveled to the main frame of the bicycle upon a transverse horizontal pivot, suitable supporting-arms slidingly engaging said guide and adapted to swing vertically in the longitudinal plane of the bicycle, and securing devices adapted to secure the supporting-arms in elevated position upon the lower forward reach of the bicycle-frame and in lowered position upon the truss-brace of the bicycle-frame. My present improvements contemplate the perfection of the bicycle-support covered by said patent, and to this end I provide an improved form of guide-bracket for the supporting-arms and fastening devices at such points upon the bicycle-frame that the bicycle may be supported in upright position with both wheels upon the ground or with either wheel elevated from the ground.

In order that my invention may be fully understood, I will first describe the same with reference to the accompanying drawings and afterward point out the novelty with more particularity in the annexed claims.

Figure 4:
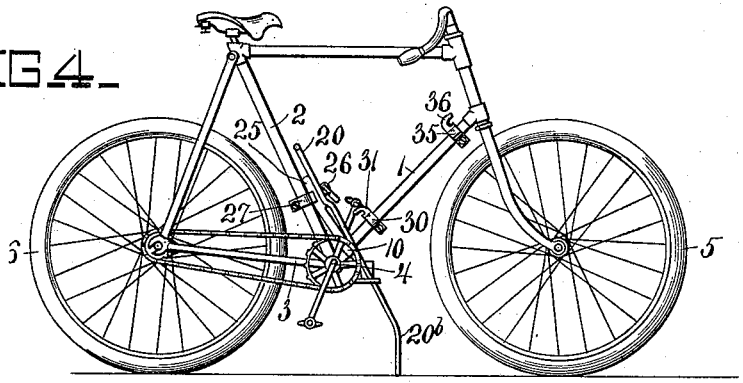
Figure 5:
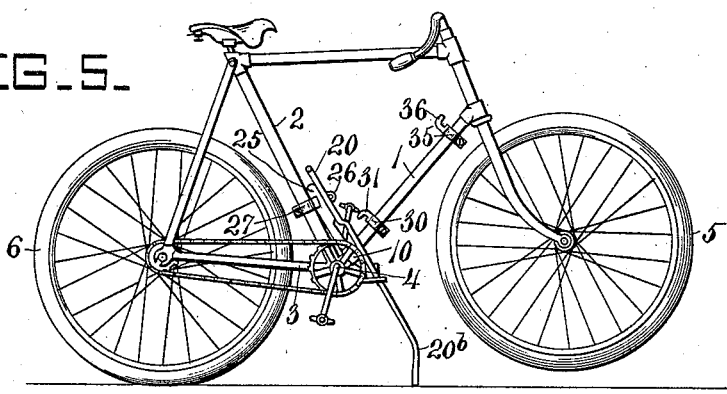
Figure 6:
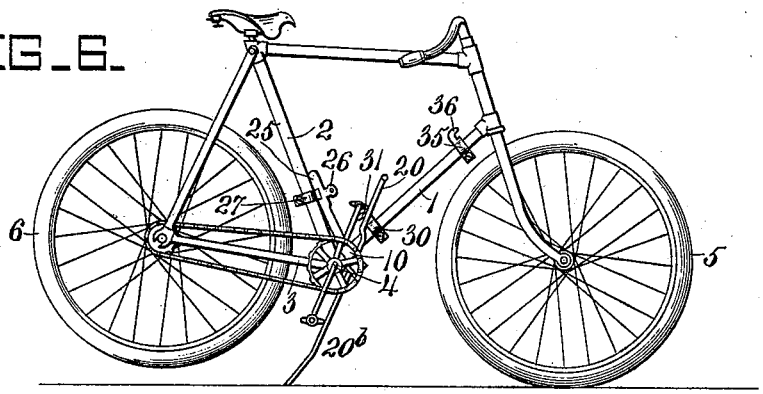

In said drawings, Figure 1 is an enlarged detail perspective view of part of a bicycle, showing my improved support applied thereto. Figs. 2 and 3 are detail transverse sectional views of the improved pivoted guide-bracket for the supporting legs or arms. Figs. 4, 5, and 6 are side elevations representing my improved support in its three operative positions.

1 is a lower forward reach, 2 is a truss-brace, 3 is the rear fork, and 4 is the crank-axle bearing, of a diamond truss-frame of a bicycle.

5 and 6 are the front and rear wheels, respectively.

10 is a split ring or collar secured to the lower forward reach 1 of the bicycle-frame, adjacent to the crank-axle bearing 4. Rivets 11 and 12, passing through the perforated ears of the split ring, secure said ring in position.

13 is a pivot-bolt passing transversely through the lower ears $10^a$ of the split ring 10, and 14 is a pivoted guide-bracket journaled upon the pivot-bolt 13 and formed with the outwardly-extending guide-arms $14^a$, formed with elongated slots $14^c$. The pivoted guide-bracket 14 is formed with a guide-slot $14^d$, in which the shoulders 15 of ears $10^a$ engage for limiting the movement of the pivoted guide-bracket in one direction, while the plate $14^e$ engages a shoulder 16 of ears $10^a$ for limiting the movement of the pivoted guide-bracket in the opposite direction.

The support proper comprises a bifurcated or Y-shaped frame 20, having supporting legs or arms $20^a$ and $20^b$, and the integral body portion $20^c$, formed with slots $20^d$. The legs or arms $20^a$ and $20^b$ are adapted to straddle the lower forward reach 1 and project through the elongated slots $14^c$ of the pivoted guide-bracket 14.

It will be observed that the pivot-bolt 13 extends transversely of the bicycle-frame to enable the supporting legs or arms $20^a$ and $20^b$ to swing vertically in the longitudinal plane of the bicycle, the purpose of which is to permit the change of the supporting-arms from one position to another, as hereinafter explained.

25 is a plate pivoted upon the rivet 12 and projecting upwardly in front of the truss-brace 2.

26 is a perforated integral lug or hook extending forwardly from the plate 25.

27 is a split ring engaging the plate 25 and encircling the truss-brace 2 for securing the plate 25 in position against the truss-brace.

30 is a split ring formed with hook 31 on its forward face and secured to the lower forward reach 1, adjacent to the split ring 10, which supports the pivoted guide-bracket 14. 35 is a similar split ring carrying the hook 36 and secured to the lower forward reach 1 at its upper end adjacent to the front fork of the bicycle.

In Figs. 1 and 4 I have represented my improved support in position to hold the bicycle in upright position with both wheels on the ground. In this position of the support perforated hook or lug 26 engages the central slot $20^d$ for holding the supporting legs or arms in lowered forwardly-inclined position, the shoulders 15 engaging in the slot $14^d$ of the pivoted guide-bracket. When it is desired to support the front wheel free of the ground, all that is necessary is to push the supporting legs or arms downwardly through the slotted guide-arms $14^a$ and bring the hook 26 into engagement with the upper slot $20^d$. This position is shown in Fig. 5. If, on the other hand, it should be desired to support the rear wheel free of the ground, the supporting legs or arms are thrown into the position shown in Fig. 6, with the hook 31 in engagement with one of the slots $20^d$ of the support. In the position shown in Fig. 6 the pivoted guide-bracket assumes the position of Fig. 3. When the supporting legs or arms are to be held up out of the way, the hook 36 engages one of the slots $20^d$, as explained in my above-named patent.

The features not specifically described are designed to operate substantially as explained in my patent above referred to.

Having thus fully described my invention, the following is what I claim as new therein and desire to secure by Letters Patent:

1. A bicycle attachment comprising a collar, means for securing the collar to the lower forward reach of a bicycle-frame, the guide-bracket having downwardly-extending arms provided with elongated parallel slots and pivoted to the collar, a Y-shaped support having legs extending through the parallel slots of the arms and adapted to be swung therein, and means for securing the support; substantially as described.

2. A bicycle attachment comprising a collar having lower ears formed with upper shoulders providing stops, the guide-bracket having a slot adapted to receive the lower ears, and downwardly-extending arms provided with elongated parallel slots, a pivot-bolt whereby the guide-bracket is pivoted to the lower ears of the collar beneath the upper shoulders and a Y-shaped support having legs extending through the parallel slots of the arms and adapted to be swung therein; substantially as described.

3. A bicycle attachment comprising a collar having lower ears formed with lower shoulders providing stops, the guide-bracket having a shoulder-plate adapted to bear against the lower shoulders, and downwardly-extending arms provided with elongated parallel slots, a pivot-bolt whereby the guide-bracket is pivoted to the lower ears of the collar above the lower shoulders, and a Y-shaped support having legs extending through the parallel slots of the arms and adapted to be swung therein; substantially as described.

4. A bicycle attachment comprising a collar having lower ears formed with upper shoulders providing stops and with lower shoulders providing stops, the guide-bracket having a slot adapted to receive the lower ears, a shoulder-plate adapted to bear against the lower shoulder and downwardly-extending arms provided with elongated parallel slots a pivot-bolt whereby the guide-bracket is pivoted to the lower ears of the collar between the upper and lower shoulders, and a Y-shaped support having legs extending through the parallel slots of the arms and adapted to be swung therein; substantially as described.

ALBERT I. GALLAWAY.

Witnesses:
JOHN E. FENNELL,
DOUGLASS H. FRAPWELL.